United States Patent
Lang et al.

(10) Patent No.: US 10,378,585 B2
(45) Date of Patent: Aug. 13, 2019

(54) BEARING ASSEMBLY WITH CONTAMINATION SENSOR

(71) Applicant: Aktiebolaget SKF, Gothenburg (SE)

(72) Inventors: Defeng Lang, Delft (NL); Phi Long Doan, Voiron (FR); Yoann Hebrard, Sarras (FR); Pierre Lemaître-Auger, Malissard (FR); Mariya Mansurova, Utrecht (NL); Florin Tatar, Delft (NL)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/658,718

(22) Filed: Jul. 25, 2017

(65) Prior Publication Data
US 2018/0038417 A1     Feb. 8, 2018

(30) Foreign Application Priority Data

Aug. 2, 2016 (GB) .................................. 1613312.6

(51) Int. Cl.
*F16C 33/66* (2006.01)
*F16C 41/00* (2006.01)
(Continued)

(52) U.S. Cl.
CPC .......... *F16C 33/6633* (2013.01); *F16C 19/52* (2013.01); *F16C 33/6625* (2013.01);
(Continued)

(58) Field of Classification Search
CPC .. F16C 33/6633; F16C 33/6625; F16C 43/04; F16N 29/00
See application file for complete search history.

(56) References Cited

U.S. PATENT DOCUMENTS 5,754,055 A     5/1998   McAdoo et al.
6,286,363 B1 *  9/2001   Discenzo ............... G01N 11/16
                                                    340/631
(Continued)

FOREIGN PATENT DOCUMENTS

EP     0499424 A2    8/1992
GB     2306660 A     5/1997
(Continued)

OTHER PUBLICATIONS

Boybay, M.S, and O.M Ramahi. "Non-destructive thickness measurement using quasi-static resonators." IEEE Microw. Wireless Compon. Lett., 2013: vol. 23, No. 4, pp. 217-219.
(Continued)

*Primary Examiner* — Tung X Nguyen
*Assistant Examiner* — Dominic Hawkins
(74) *Attorney, Agent, or Firm* — Bryan Peckjian; SKF USA Inc. Patent Dept.

(57) ABSTRACT

An assembly providing a bearing, a lubricant and a contamination sensor for determining a level of contamination in the lubricant. The sensor includes an EM wave generator for generating an EM signal, and an EM sensing element arranged in contact with the lubricant. The EM sensing element receives the generated EM signal and transmits an output signal whose properties are responsive to real and imaginary parts of a complex relative permittivity of the lubricant. The output signal is received by an EM measuring device that measures first and second parameters of the output signal, which are respectively representative of the real and imaginary parts of the complex relative permittivity. The EM measuring device determines a level of water contamination in the lubricant, based on the measured first parameter alone and determines a level of metal particle (Continued)

contamination in the grease, based on the measured first and second parameters.

12 Claims, 4 Drawing Sheets

(51) Int. Cl.
  *F16C 43/04* (2006.01)
  *F16N 29/00* (2006.01)
  *F16C 19/52* (2006.01)
  *F16C 19/38* (2006.01)
  *F16C 23/08* (2006.01)

(52) U.S. Cl.
  CPC ............ *F16C 41/008* (2013.01); *F16C 43/04* (2013.01); *F16N 29/00* (2013.01); *F16C 19/38* (2013.01); *F16C 23/086* (2013.01); *F16C 2210/02* (2013.01); *F16C 2233/00* (2013.01)

(56) References Cited

U.S. PATENT DOCUMENTS

| | | | |
|---|---|---|---|
| 6,617,861 | B1 | 9/2003 | Joshi |
| 7,442,291 | B1* | 10/2008 | Discenzo ............. B01D 35/143 210/443 |
| 8,624,191 | B2 | 1/2014 | Franke et al. |
| 2014/0238742 | A1* | 8/2014 | Borek ................... F16N 29/02 175/40 |

FOREIGN PATENT DOCUMENTS

| | | |
|---|---|---|
| JP | 2003172494 A | 6/2003 |
| JP | 2003232345 A | 8/2003 |
| WO | 2006075049 A1 | 7/2006 |

OTHER PUBLICATIONS

Boybay, Muhammed S, and Omar M. Ramahi. "Material Characterization Using Complementary Split-Ring Resonators" IEEE Trans. Instrum. Meas., 2012: vol. 61, No. 11, pp. 3039-304.

Hsu, Chia-Ming, Kuan-Zhou Chen, Chieh-Sen Lee, and Chin-Lung Yang. "Improved Approach Using Multiple Planar Complementary Split-Ring Resonators for Accurate Measurement of Permittivity" IEEE, 2016.

Lee, Chieh-Sen, and Chin-Lung Yang. "Complementary Split-Ring Resonators for Measuring Dielectric Constants and Loss Tangents" IEEE Microwave And Wireless Components Letters, 2014: vol. 24, No. 8, pp. 563-565.

Lee, Chieh-Sen, and Chin-Lung Yang. "Thickness and Permittivity Measurement in Multi-Layered Dielectric Structures Using Complementary Split-Ring Resonators" IEEE Sensor Journal, 2014: vol. 14, No. 3, pp. 695-700.

Verma, A.K., Nasimuddin, and A.S. Omar. "Microstrip resonator sensors for determination of complex permittivity of material in sheet, liquid, and paste forms" IEEE Proc.-Microw. Antennas Propag., 2005: vol. 152, No. 1.

Bernard, P.A., and J.M. Gautray. "Measurement of Dielectric Constant Using a Microstrip Ring Resonator" IEEE Trans. Microwave Theory Tech, 1991: vol. 39, pp. 592-595.

Dong, Jing, et al. "Noncontact Measurement of Complex Permittivity of Electrically Small Samples at Microwave Frequencies" IEEE Transactions On Microwave Theory and Techniques, 2016: vol. 64, No. 9, pp. 2883-2893.

Yang, Chin-Lung, Chieh-Sen Lee, Kuan-Wei Chen, and Kuan-Zhou Chen. "Noncontact Measurement of Complex Permittivity and Thickness by Using Planar Resonators" IEEE Transactions On Microwave Theory and Techniques, 2016: vol. 64, No. 1, pp. 247-257.

* cited by examiner

BEARING ASSEMBLY WITH CONTAMINATION SENSOR

CROSS REFERENCE TO RELATED APPLICATIONS

This application claims priority to British patent application no. 1613312.6 filed on 8 Feb. 2016, the contents of which are fully incorporated herein by reference.

FIELD OF THE INVENTION

The invention relates to a bearing assembly provided with a sensor for detecting contamination in a grease lubricant that lubricates the bearing.

BACKGROUND OF THE INVENTION

Lubrication is essential for ensuring proper operation of a bearing. It is therefore desirable in many applications to monitor the lubricant within the bearing, so that a re-lubrication action can be initiated if, for example, the lubricant contains an unacceptable level of water or particulate contamination.

A device for determining metallic contaminant particles in lubricating grease is disclosed in WO 2006/075049. A sample of grease is first taken from e.g. a bearing to allow the determination to be made. The device comprises a sensor with a core, on which the measured grease sample is placed, and a sensor coil which is wound around the core. The device also comprises an alternating current source for supplying the operating voltage and an inductance measurement bridge for determining the change of the impedance of the sensor coil, when a sample of lubricating grease containing contaminating particles is applied on the sensor, and for outputting a differential output signal.

A drawback of this solution is that a sample of grease must be taken from the bearing. In many applications, this is inconvenient or may be impossible due to the inaccessibility of the bearing.

A further example of a measurement apparatus for analysis of a lubricant of a bearing is known from U.S. Pat. No. 8,624,191. The apparatus comprises a transmitter, a receiver and a sample area, which is arranged in front of the transmitter and the receiver. The sample area is arranged at least partly within the bearing interior, which is filled with a lubricant. The sample area, the transmitter, and the receiver are configured with a diffuse reflection geometry so that the transmitter irradiates the sample area with e.g. IR light and the receiver receives diffuse reflection of the IR light from the sample area, which is then used to measure deterioration of the lubricant.

There is room for improvement.

BRIEF SUMMARY OF THE INVENTION

The present invention relates to an assembly comprising a bearing, a grease lubricant and a contamination sensor for determining a level of contamination in the grease. The contamination sensor comprises an electromagnetic wave generator for generating an EM signal having a frequency of greater than 1 GHz, and an EM sensing element that is arranged in contact with the grease. The EM sensing element receives the generated EM signal and transmits an output signal whose signal properties are responsive to a real part and an imaginary part of a complex relative permittivity of the grease. The output signal is received by an EM measuring device which measures first and second parameters of the output signal which are respectively representative of the real part and the imaginary part of the complex relative permittivity of the grease. In accordance with the invention, the EM measuring device is configured to determine a level of water contamination in the lubricant, based on the measured first parameter alone and to determine a level of metal particle contamination in the grease, based on both of the measured first and second parameters.

In the frequency domain, the complex relative permittivity $\varepsilon^*$ of a material to that of free space can be expressed as:

$$\varepsilon^* = \varepsilon' - j\varepsilon'', \text{ where}$$

$\varepsilon'$ is the real part of the complex relative permittivity, which will be referred to as the real permittivity;

$\varepsilon''$ is the imaginary part of the complex relative permittivity, which will be referred to as the imaginary permittivity; and $$j = \sqrt{-1}$$

The real permittivity is generally referred to as the dielectric constant and represents the stored energy when the material is exposed to an electric field. The imaginary permittivity represents the dielectric loss factor and influences energy absorption and attenuation. The inventors have found that at frequencies higher than 1 GHz, the level of water contamination present in a grease lubricant strongly influences the real permittivity, while the presence of metal particles has a negligible effect. Thus, the level of water contamination in the lubricant can be determined by measuring a first parameter that is representative of the real permittivity and comparing the measured value with a reference value measured for a reference sample of the same lubricant in uncontaminated condition, or with a stored look-up table of reference values or calibration curves measured for reference samples of the same grease having known concentrations of water.

The inventors have further found that at frequencies higher than 1 GHz, the presence of metal particles has a detectable influence on the imaginary permittivity. Consequently, a second parameter that is representative of imaginary permittivity is measured. The concentration of water present in the lubricant affects both the real and the imaginary permittivity. The presence of both contaminants will cause a shift in the value of the second measured parameter, relative to a reference value that is measured for a reference sample of the grease in uncontaminated condition. Therefore, once the water concentration has been derived from the measured first parameter, its contribution to the shift in imaginary permittivity can be extracted, to isolate the contribution from the metal particles.

In an embodiment, the EM measuring device is further configured to calculate a portion of the measured second parameter value that is attributable to the determined level of water contamination, and to subtract this portion from the measured value to obtain an adjusted value for the second parameter. The concentration of metal particles present in the lubricant can then be derived by comparing the adjusted value with the reference value measured for the grease lubricant in uncontaminated condition, or with a look-up table of reference values or calibration curves measured for reference samples of the same lubricant containing known concentrations of metal particles.

Alternatively, the measured second parameter can be compared with a look-up of table of reference values or calibration curves for reference samples containing a known concentration of water and a known concentration of metal particles.

In a further embodiment, the EM measuring device is configured to calculate the real permittivity of the lubricant using the measured first parameter value and to calculate the imaginary permittivity using the measured second parameter value. The calculated values are then compared with reference values calculated for reference samples of the same lubricant as described above.

In a preferred example, the EM sensing element comprises an input port (port 1) and an output port (port 2). The presence of lubricant on the sensing element influences the input-output relationships between the ports. Specifically, the real permittivity $\varepsilon'$ of the lubricant influences the propagation speed of the EM signal, while the imaginary permittivity $\varepsilon''$ influences signal amplitude. In an embodiment, the EM measuring device is configured to measure the power transmitted from port 1 to port 2, typically referred to as the S21 parameter. Alternatively or additionally, the EM measuring device may be configured to measure the power reflected from port 2 to port 1, typically referred to as the S11 parameter.

The measured first parameter, representative of real permittivity, can be a phase angle of the S21 parameter and/or S11 parameter. In both cases, signal amplitude is the measured second parameter representative of imaginary permittivity. In embodiments where the EM measuring device is configured to measure the phase angle and amplitude of multiple scattering parameters, i.e. S21 and S11, and possibly also S12 and S22, the measured values for each scattering parameter may be used to calculate the real and imaginary permittivity of the lubricant.

In a further example, the contamination sensor is configured to measure the amplitude the S21 parameter and/or S11 parameter as a function of frequency. The resonance frequency of the parameter can then be determined from the output signal, whereby the value of the resonance frequency is representative of the real permittivity of the grease covering the sensing element and the amplitude of the determined resonance frequency is representative of imaginary permittivity.

In one embodiment, the two-port sensing element comprises a transmission line. A grounded coplanar waveguide is one example of a suitable transmission line.

In a further embodiment, the two-port sensing element comprises a resonator, preferably equipped with a field concentrator, such as a ring resonator, a bow-tie resonator, a split ring resonator or a complementary split ring resonator.

Preferably, the EM sensor is configured to operate in a frequency range of between 1 and 100 GHz. The EM wave generator can be a signal generator that is able to generate a multi-frequency EM signal in the 1-100 GHz range, whereby the EM measuring device is suitably equipped to receive and measure the multi-frequency output signal. Alternatively, the EM wave generator may comprise a basic oscillator circuit that produces an EM signal at a specific frequency or a few different frequencies. Advantageously, the frequency is selected to coincide with a resonant frequency of the sensing element, as it has been found that this enhances the resolution of the measured values. The EM measuring device is then configured to receive and measure the output signal within a narrow frequency band that comprises the resonant frequency. For example, if the EM wave generator transmits an input signal with a frequency of 10.5 GHz, the EM measuring device can be configured to receive and measure the output signal within a range of 10-11 GHz. As will be understood, the EM wave generator and the EM measuring device can form part of a single device.

The EM sensing element is arranged in contact with the grease lubricant. The sensing element may be mounted to a stationary ring of the bearing, typically the outer ring, or to an axially inner surface of a bearing seal. If the bearing is mounted in a sealed housing, the EM sensing element can be mounted to the housing so as to lie axially between the bearing and the housing seal. The bearing can also form part of a system that is lubricated via a circulating grease supply. The EM sensing element may then be arranged in a grease supply line.

In some embodiments, the EM sensing element has an open geometry and is provided on an open surface of the EM sensor. Preferably, the EM sensor has a planar geometry. The EM sensing element may be printed on a PCB. A planar or open geometry is advantageous, so that the grease lubricant can readily come into contact with the EM sensing element.

Suitably, the EM measuring device is further configured to compare the determined levels of water and metal particle contamination with allowable threshold values for these quantities and to transmit an alarm signal if at least one of the determined contamination levels exceeds the allowable threshold. In applications where the bearing is connected to a lubrication pump, the alarm signal is advantageously transmitted to the pump, to trigger the supply of fresh lubricant. Alternatively or additionally, the signal may be sent to a condition monitoring system, to alert a maintenance technician to perform manual relubrication and check the condition of seals of the bearing assembly.

Thus, the bearing can be protected against damage caused by operating with a lubricant in an unacceptable condition. Other advantages of the invention will become apparent from the following detailed description and accompanying figures.

BRIEF DESCRIPTION OF THE SEVERAL VIEWS OF THE DRAWING

FIGS. 1b, 1c respectively show a plan view and cross-sectional view of part of the EM permittivity sensor from FIG. 1a;

FIG. 3b shows a plot of resonance frequency against water concentration, obtained from the measurement results shown in FIG. 3a;

FIG. 4b shows a plot of resonance frequency amplitude against iron-particle concentration, obtained from the measurement results shown in FIG. 4a;

DETAILED DESCRIPTION OF THE INVENTION

Figure 1A:
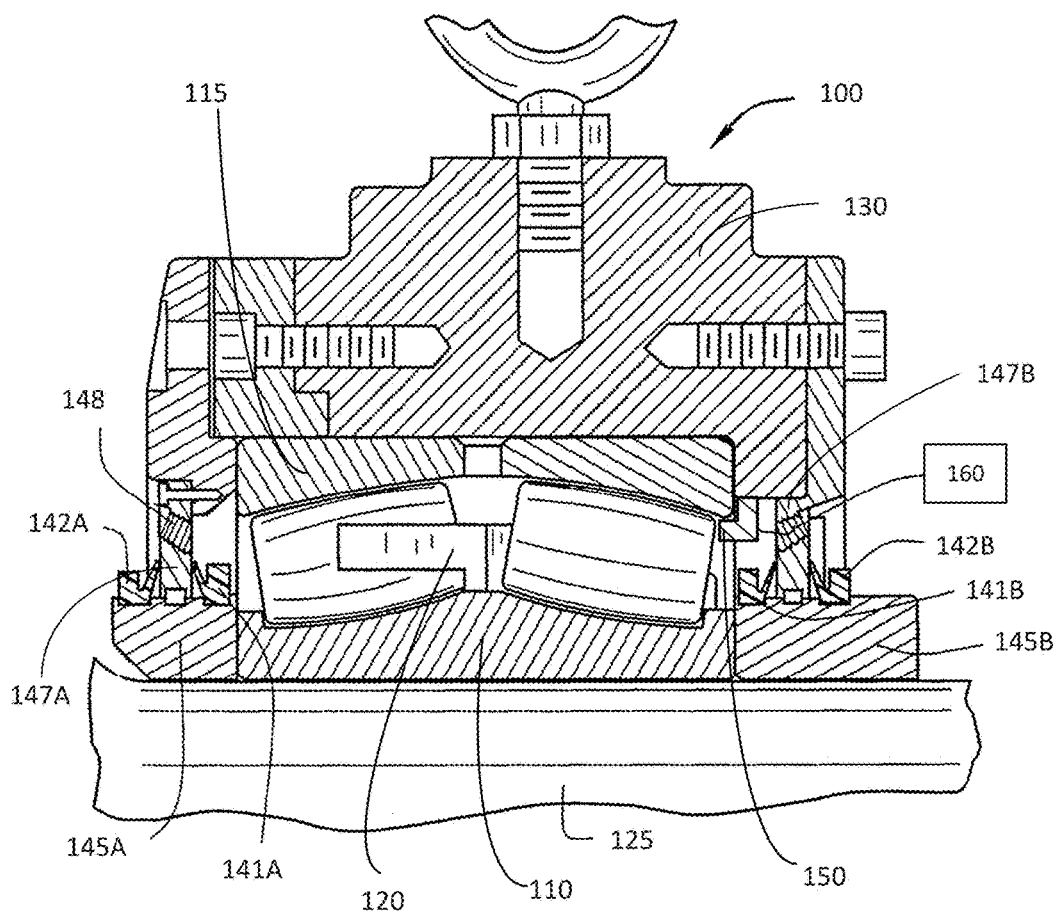
FIG. 1a illustrates an example of an assembly according to the invention comprising a sealed roller bearing and an EM permittivity sensor for measuring lubricant contamination.

FIG. 1 shows a partial radial cross-section of an example of a bearing assembly according to the invention. The assembly 100 comprises a roller bearing having an inner ring 110, an outer ring 115 and first and second rows of rollers retained in a bearing cage 120. The bearing supports a shaft 125 relative to a housing 130 and is lubricated with a grease (not shown). To retain the grease within the housing 130 and prevent the entry of contaminants, the assembly is sealed at each axial end by first and second inner 141A, 141B and outer sealing elements 142A, 142B. The sealing elements are mounted to respective first and second seal carriers 145A, 145B, which are mounted to the shaft 125 so as to rotate therewith. The sealing arrangement further comprises first and second shield plates 147A, 147B which are fixed to the housing 130 at either axial side of the bearing. Each shield plate extends radially towards the respective seal carrier 145A, 145B, and is arranged axially between the respective inner and outer seals. Further, the first and second inner sealing elements 141A, 141B have a contact lip that bears against an axially inner surface of the respective first and second shield plates 147A, 147B, while the first and second outer sealing elements 142A, 142B have a contact lip that bears against an axially outer surface of the respective first and second shield plates.

The bearing assembly 100 is designed to enable the bearing to be re-lubricated with grease via a lubrication port that extends through the bearing outer ring 115 and is arranged axially between the first and second sets of rollers. During a re-lubrication action, fresh grease enters the bearing cavity and used grease is pressed out. To enable the used grease to exit the bearing assembly 100, the first and second shield plates 147A, 147B are provided with an opening 148 to which e.g. tubing can be coupled.

In many applications, a lubrication system that relubricates one or more bearing assemblies is a time-based system, whereby a relubrication action is triggered after a prescribed interval derived from grease life experiments. In the depicted application, the lubrication system that relubricates the bearing assembly 100 employs active lubrication, based at least partly on a measured condition of the grease. Specifically, the assembly is provided with a contamination sensor 150 for measuring a level of water contamination and of metal-particle contamination that is present in the grease within the assembly. The presence of water within grease adversely affects its lubricating ability and can lead to corrosion within the bearing. The presence of metal particles can cause a significant reduction in the fatigue life of rolling contact surfaces of the bearing. If an unacceptable level of either type of contamination is measured, an alarm signal is transmitted to the lubrication system, to initiate the supply of fresh grease.

The contamination sensor is an EM sensor that is sensitive to changes in a complex relative permittivity of grease that is in contact with a sensing element of the sensor, whereby the EM sensor operates at a frequency higher than 1 GHz. The inventors have found that a real part $\varepsilon'$ of the complex relative permittivity can be correlated to the content of water within the grease, while the presence of metal particles has a negligible influence or no influence on real permittivity. The water content can thus be derived from the real permittivity $\varepsilon'$. The inventors have further found that an imaginary part $\varepsilon''$ of the complex relative permittivity is influenced by both the water content and the amount of metal particles. Since the water content has been derived from the real permittivity measurement, its contribution to the measured imaginary permittivity can be eliminated. The remaining contribution is then used to derive the content of metal particles within the grease.

Figure 1B:
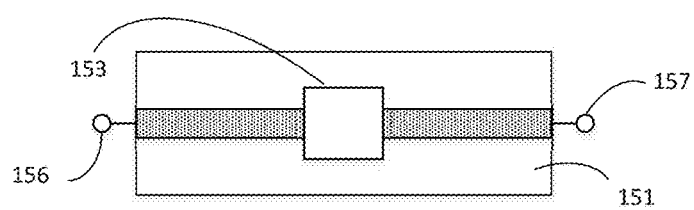
Figure 1C:
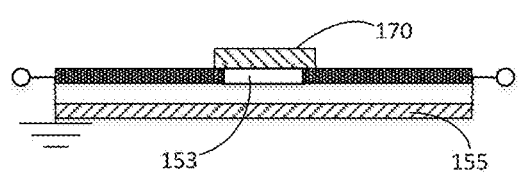

In the depicted example, the sensing element of the EM sensor is a planar ring resonator 153 that is printed on a PCB. Part of the PCB is shown in FIGS. 1b and 1c. The planar resonator 153 is printed on a substrate 151 of the PCB, and is coupled to an input port 156 and an output port 157. An underside of the substrate 51 comprises a conductive layer 155, which serves as a ground plane. The sensor further comprises an oscillator circuit that supplies the input port 156 of the resonator with an EM signal with a frequency of 10 GHz, which is close to the unloaded resonance frequency of the ring resonator 153 in this example. In other examples, the sensor is dimensioned to have a higher resonance frequency and the input frequency may be 20 GHz or higher. The output port 157 is connected to a processor (not shown), which receives an output signal from the resonator 153. The processor may be provided on the PCB, or may be part of a device arranged outside of the bearing arrangement.

The EM sensor 150 is mounted to the housing 30 and the sensing element 153 is provided on a radially inward facing planar surface, which extends somewhat into a cavity between the bearing rings at one axial side. During bearing operation, centrifugal forces act on grease that is present on the rotational inner ring 110, causing it to be flung towards the outer ring. Some grease 170 will therefore be flung onto the sensing element 153 of the sensor 150, as schematically depicted in FIG. 1c. The presence of grease on the ring resonator affects the output signal and it has been found that changes in the complex relative permittivity $\varepsilon^*$ of the grease also affect the phase angle and amplitude of the output signal. Specifically, the real permittivity $\varepsilon'$ influences the speed at which the EM signal propagates through the grease, which is quantified in the depicted example by measuring the phase angle of an S21 scattering parameter, being the power transmitted from the input port 156 to the output port 157. The amplitude of the S21 parameter is measured to quantify the imaginary permittivity $\varepsilon''$.

The processor is configured to compare the measured phase angle with stored calibration curves and to calculate the amount of water present in the grease, based on a determined phase shift. A change in the measured amplitude, relative to a reference value obtained for uncontaminated grease, is influenced by the presence of both water and metal particles. Suitably, the processor is configured to calculate a portion of the change in amplitude that is attributable to the determined water content, and subtract this portion to obtain an adjusted amplitude. The processor is further configured to compare this adjusted value with stored calibration curves, to determine the content of metal particles.

Preferably, the processor has a memory which stores reference data obtained from experiments using a number reference samples of the same grease having known concentrations of water. The same signal parameters are measured (phase angle and amplitude of the S21 parameter in the present example), to enable a correlation between water content and both real and imaginary permittivity. The reference data also includes amplitude measurements performed for a number of reference samples containing known concentrations of metal particles, such that the correlation with imaginary permittivity can be made.

If an unacceptable level of water or metal particles is detected, the processor is configured to transmit an alarm signal. In the depicted example, the contamination sensor 150 is connected to a controller 160. The connection may be a wired connection that exits the bearing assembly 100 via the opening 148 in the second shield plate 147B. The sensor may also be a wireless sensor. When the controller receives the alarm signal, a relubrication action is triggered. Suitably, an alert is also sent to a maintenance planning system, to trigger an inspection of the seals and/or of the bearing assembly.

Figure 2:
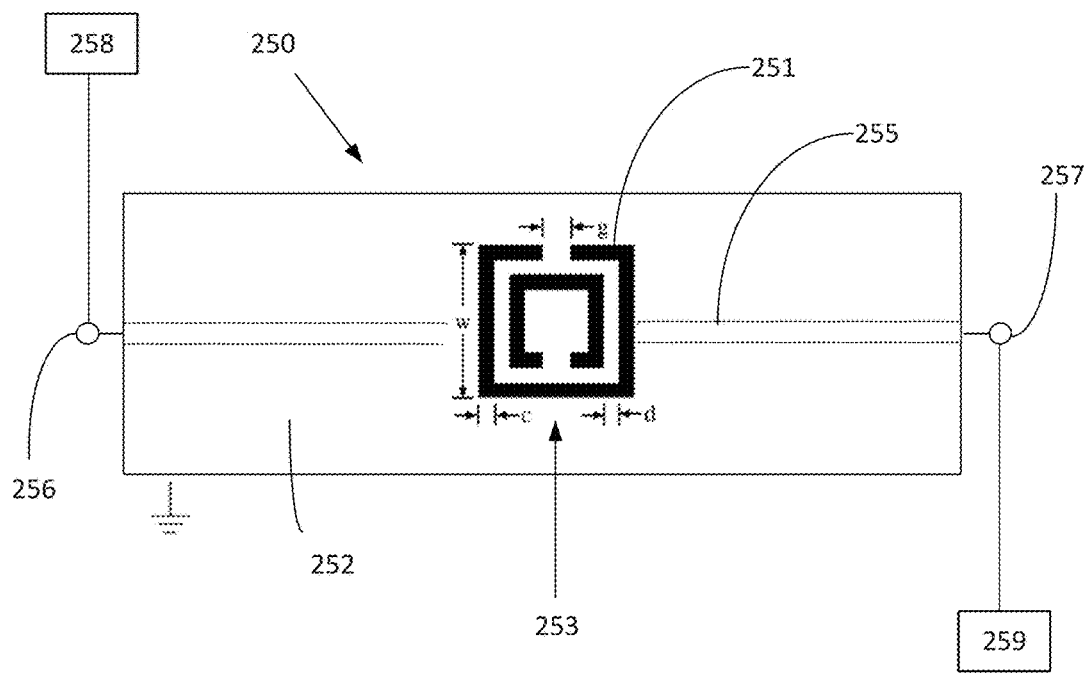
FIG. 2 shows a plan view of a further example of an EM permittivity sensor that may be used to measure contamination.

In a further embodiment, the contamination sensor used in a bearing assembly according to the invention comprises a complementary split ring resonator, such as shown in FIG. 2, and is configured to determine water content from a measured resonance frequency of the S21 transmission parameter.

The sensor 250 comprises a top layer 252 made of electrically conducting material such as copper, which serves as the ground plane. The top layer 252 is provided on a substrate 251 of electrically insulating PCB material. Material from the top layer 252 is removed, to create a split ring resonator structure 253, which in the depicted example comprises two concentrically arranged square split rings, whereby each square ring has a gap g on oppositely oriented sides of the square ring. The underside of the PCB substrate 251 is provided with a microstrip transmission line 255 made of e.g. copper, which is indicated via the dotted lines in FIG. 2.

A first end of the transmission line 255 represents an input port 256 (port 1) and a second end represents an output port 257 (port 2). The input port 256 and ground plane are connected to a signal generator 258, which supplies an input EM signal at a number of frequencies within a desired frequency range. The output port and ground plane are connected to a signal analyser 259, such as a vector network analyser.

The dimensions of the resonator structure 253 ($g, w, c, d$) are selected to obtain an unloaded resonance frequency of the sensor 250 in a desired frequency range. In the depicted example, the unloaded resonance frequency of the sensor is around 3.6 GHz.

The signal analyser 259 is configured to measure the power transmitted from the input to the output port, i.e. the S21 parameter, as a function of frequency. The sensor is calibrated by measuring the S21 parameter when air and the substrate material 251 are the only dielectric materials in contact with the ground plane 255. When grease covers the resonator structure 253, the resonance frequency and amplitude of the S21 parameter will change. The real part $\varepsilon'$ of the complex permittivity of the dielectric materials can be calculated from the resonance frequency of the S21 parameter, while the imaginary part $\varepsilon''$ can be calculated from the amplitude of the resonance frequency.

The sensor 250 is further calibrated by performing the measurements when the resonating structure 253 is covered with a sample of fresh grease in uncontaminated condition, and with grease samples containing known amounts of water contamination only and known amounts of metal particle contamination only and, optionally, containing known amounts of both water and metal particles.

Example 1

Three grease samples were prepared by respectively adding 1%, 2% and 4% by weight of water to an uncontaminated grease. A fourth sample consisted of the uncontaminated grease, i.e. 0% water. The same volume of each grease sample was placed on top of the resonator structure 253 of an EM sensor 250 such as shown in FIG. 2. For each sample, the amplitude of the transmitted power (S21 parameter) was measured as a function of frequency by a vector network analyser 259. The measurement was further performed with no sample present on the resonator 253. The results are plotted in the graph of FIG. 3a.

The line 301 represents the measurement with no sample. The lines 302, 303, 304, and 305 respectively represent the measurements for the grease samples containing 0%, 1%, 2% and 4% water. The peak minimum amplitude of each line indicates the frequency at which resonance occurs. As may be seen, the resonance frequency of the measured S21 parameter decreases when the uncontaminated grease sample is placed on the resonator 253 and continues to decrease as the water content in each subsequent sample rises. The resonance frequency is plotted against water content in the graph of FIG. 3a, and an almost linear relationship is observed. This relationship can thus be used to calibrate the sensor, suitably with the aid of curve fitting tools.

Figure 3A:
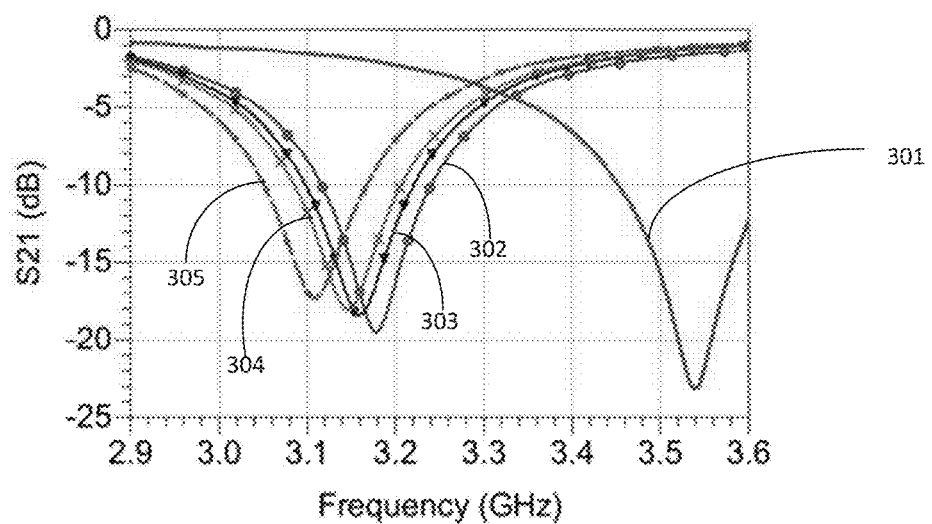
FIG. 3a shows a graph of signal amplitude as a function of frequency measured for grease samples comprising different amounts of water contamination.
Figure 3B:
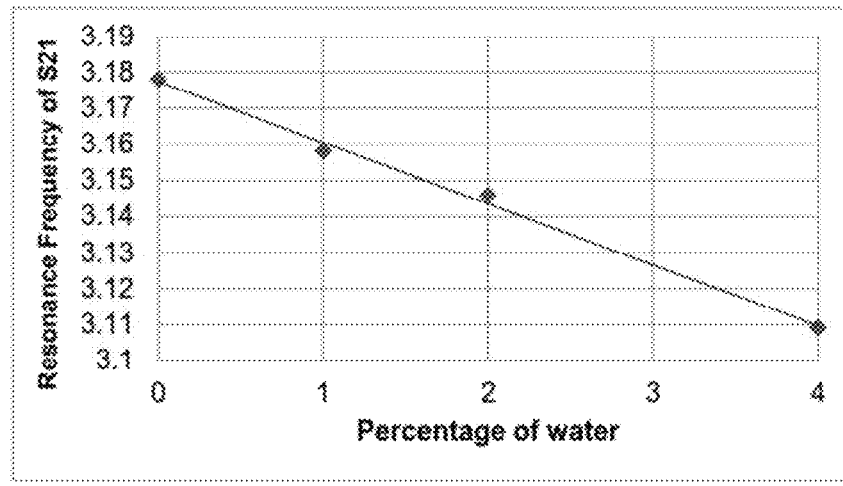

With reference to FIG. 3a, it can also be seen that the amplitude of the resonance frequency decreases as the water content increases. A relationship can also be derived between amplitude and water content, suitably with the aid of curve fitting tools, and this relationship is used to further calibrate the sensor.

Example 2

A further four grease samples were prepared by respectively adding 0.5%, 1%, 2% and 4% by weight of iron particles to uncontaminated grease. A fifth sample consisting of the uncontaminated grease was also prepared. For each sample, the same measurement was performed using the same sensor as described for Example 1. The measurement results are plotted in the graph of FIG. 4a. The line 401 represents the amplitude of the S21 parameter measured as a function of frequency for the sample containing 4% iron. The line 402 represents the measurement results for the sample containing 2% iron. The results for the samples containing 1%, 0.5% and 0% iron are not distinguishable from each other in the depicted graph, but it can be seen that the presence of different amounts of iron has no effect on the resonance frequency. Consequently, a measured shift in resonance frequency can be directly correlated to the presence of water.

Figure 4A:
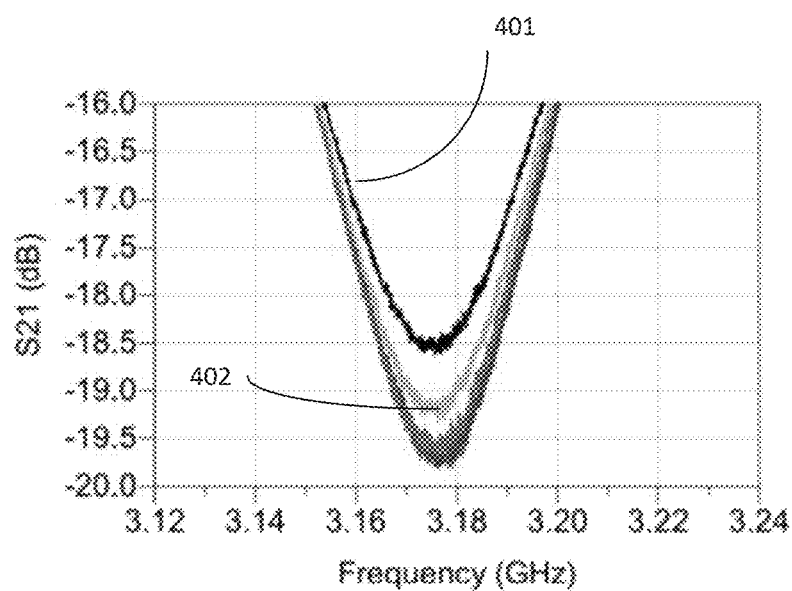
FIG. 4a shows a graph of signal amplitude as a function of frequency measured for grease samples comprising different amounts of iron particles.

As may further be seen from FIG. 4a, the amplitude of the measured transmission parameter S21 is affected by the presence of iron particles. The measured amplitude at the S21 resonance frequency for each of the samples is plotted against % iron content in the graph of FIG. 4b. Again, an almost linear relationship is obtained which may be used to further calibrate the sensor, suitably with the aid of curve fitting tools.

Figure 4B:
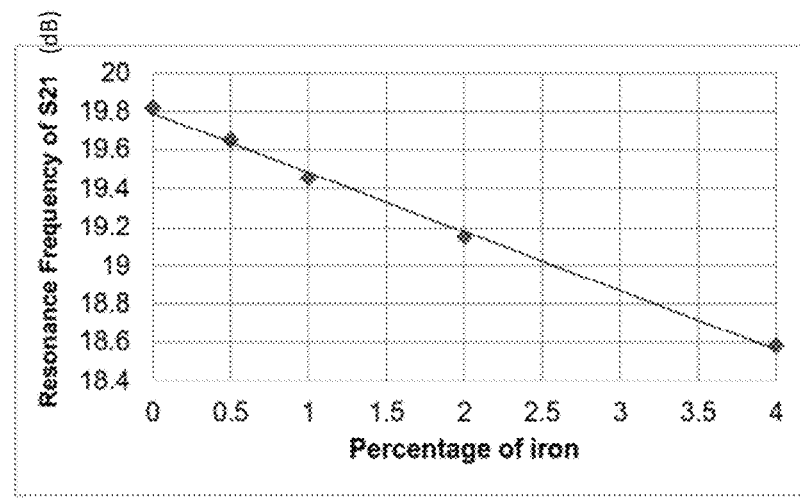

If a grease sample containing unknown amounts of water and iron is placed on the resonating structure 253, these amounts can be determined as follows:

First, the water content is derived from the measured resonance frequency using a determined relationship, such as shown in FIG. 3a. If the water content is greater than 0, a determined relationship between water content and resonance frequency amplitude can then be used to estimate the shift in amplitude, relative to the amplitude measured for uncontaminated grease, that is associated with the derived water content. The amount of this amplitude shift can then be subtracted from the amplitude that has actually been measured for the unknown sample, to obtain an adjusted amplitude. Finally, a relationship between amplitude and iron-particle content, such as shown in FIG. 4b, can then be used to derive the iron contamination from the adjusted amplitude.

Alternatively, the amount of iron particle contamination can be derived based on reference curves measured for reference samples containing different amounts of water as well as different amounts of iron particles.

Example 3

Figure 5:
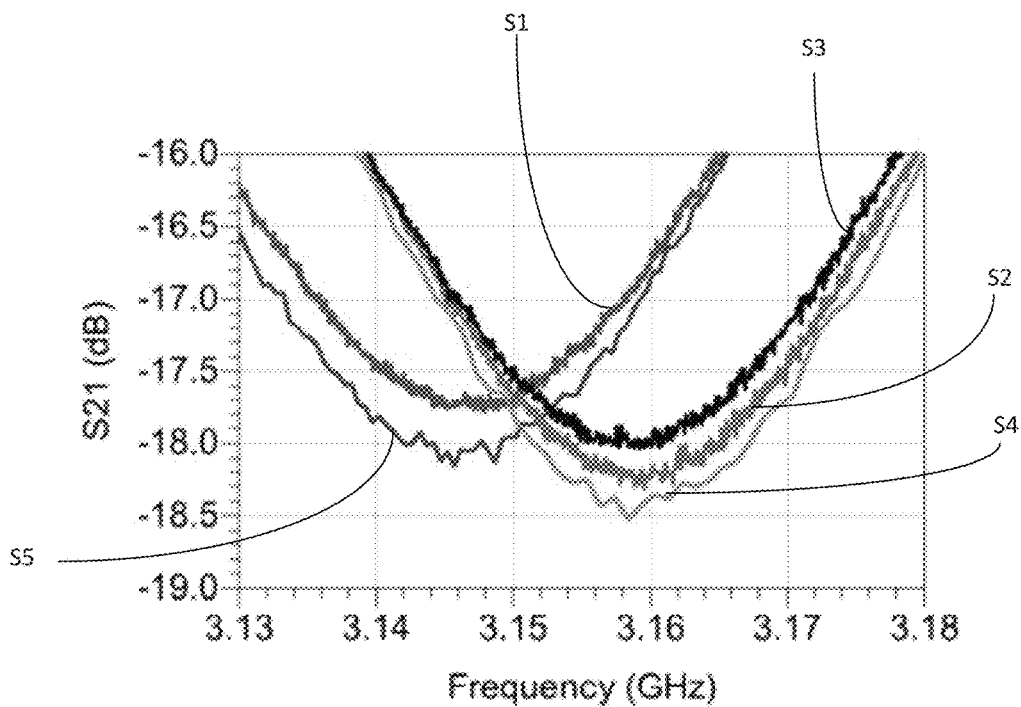
FIG. 5 shows a graph of signal amplitude as a function of frequency measured for grease samples comprising different amounts of iron particles and different concentrations of water.

A further three grease samples were prepared by adding both metal and water contamination to uncontaminated grease. S1: 2% water and 2% iron particles; S2: 1% water and 1% iron particles; S3: 1% water and 2% iron particles. Two reference samples were also prepared. S4 containing 1% water and 0% iron; S5: containing 2% water and 0% iron. For each sample, the same measurement was performed using the same sensor as described for Example 1. The measurement results are plotted in the graph of FIG. 5.

Again it may be seen that the presence of iron particles does not affect the resonance frequency. The samples S1 and S5 with a water content of 1% exhibit the same resonance frequency, as does the other batch of samples S2, S3, S4 with a water content of 2%. It may also be seen that the amplitude of the resonance frequency is not only affected by the content of iron, but also by the water content. As mentioned above, the content of iron can be derived from such reference curves, after the water content has been determined from the measured resonance frequency.

The invention claimed is:

1. An assembly comprising:
a bearing,
a grease lubricant, and
a contamination sensor for measuring a level of contamination in the grease lubricant, wherein
the contamination sensor is an electromagnetic sensor that includes;
an electromagnetic wave generator configured to generate an EM signal having a frequency higher than 1.0 GHz,
an EM sensing element arranged in contact with the grease lubricant and configured to receive the generated signal and transmit an output signal whose signal properties are responsive to a real part $\varepsilon'$ and an imaginary part $\varepsilon''$ of a complex relative permittivity of the grease lubricant; and
an EM measuring device configured to receive the output signal and to;
measure a first parameter and a second parameter of the output signal which are respectively representative of the real part $\varepsilon'$ and the imaginary part $\varepsilon''$ of the complex relative permittivity of the grease lubricant;
derive a level of water contamination in the grease lubricant based on the measured first parameter alone; and
derive a level of metal particle contamination in the grease lubricant based on both of the measured first and second parameters.

2. The assembly of claim 1, wherein the EM measurement device provides a memory in which reference data is stored, the reference data including reference values of the first and second parameters measured for reference samples of the lubricant containing known concentrations of water, and
reference values of the second parameter measured for reference samples of the lubricant containing known concentrations of metal particles.

3. The assembly of claim 2, wherein the EM measurement device (259) is configured to calculate a portion of the measured second parameter value that is attributable to the determined level of water contamination, and to subtract this portion from the measured value to obtain an adjusted value for the second parameter, whereby the level of metal particle contamination is determined from the adjusted value.

4. The assembly of claim 1, wherein the EM wave generator is configured to generate an EM signal having a frequency of between 1.0 and 100 GHz.

5. The assembly of claim 1, wherein the EM sensing element is arranged on an open surface of the sensor.

6. The assembly of claim 1, wherein the EM sensing element comprises an input port and an output port.

7. The assembly of claim 6, wherein the output signal comprises power transmitted from the input port to the output port, and wherein the measured first and second parameters are respectively a phase angle and an amplitude of the transmitted power.

8. The assembly of claim 6, wherein the output signal comprises power reflected from the output port to the input port, and wherein the measured first and second parameters are respectively a phase angle and an amplitude of the reflected power.

9. The assembly of claim 1, wherein the EM sensing element comprises a resonator with field concentration means.

10. The assembly of claim 1, further comprising an annular seal for retaining the lubricant within the assembly, wherein the EM sensing element is arranged on an axially inner surface of the seal.

11. The assembly of claim 1, wherein the sensor is mounted to an outer ring of the bearing, or to a housing to which the outer ring is mounted, such that the EM sensing element faces in a radially inward direction.

12. The assembly of claim 1, wherein the EM wave generator is configured to generate an EM signal at frequency that is equal to or approximately equal to a determined resonant frequency of the sensor.

* * * * *